(12) United States Patent
Anderson et al.

(10) Patent No.: US 8,648,863 B1
(45) Date of Patent: Feb. 11, 2014

(54) METHODS AND APPARATUS FOR PERFORMANCE STYLE EXTRACTION FOR QUALITY CONTROL OF ANIMATION

(75) Inventors: John Anderson, San Anselmo, CA (US); Andrew P. Witkin, Oakland, CA (US); Robert Cook, San Anselmo, CA (US)

(73) Assignee: Pixar, Emeryville, CA (US)

( * ) Notice: Subject to any disclaimer, the term of this patent is extended or adjusted under 35 U.S.C. 154(b) by 1100 days.

(21) Appl. No.: 12/124,006

(22) Filed: May 20, 2008

(51) Int. Cl.
*G06T 13/00* (2011.01)
*G06T 15/00* (2011.01)
*G06K 9/00* (2006.01)
*G06K 9/46* (2006.01)
*G06F 19/00* (2011.01)

(52) U.S. Cl.
USPC ........... 345/473; 345/474; 345/419; 382/118; 382/155; 382/159; 382/190; 700/245

(58) Field of Classification Search
None
See application file for complete search history.

(56) References Cited

U.S. PATENT DOCUMENTS

| | | | |
|---|---|---|---|
| 2005/0197741 A1* | 9/2005 | Sabe et al. | 700/245 |
| 2005/0220363 A1* | 10/2005 | Oldroyd | 382/294 |
| 2007/0009135 A1* | 1/2007 | Ishiyama | 382/103 |
| 2008/0012866 A1* | 1/2008 | Forbes | 345/473 |
| 2008/0231640 A1* | 9/2008 | Pighin et al. | 345/619 |
| 2009/0066700 A1* | 3/2009 | Harding et al. | 345/473 |
| 2009/0195545 A1* | 8/2009 | Debevec et al. | 345/473 |
| 2010/0020073 A1* | 1/2010 | Corazza et al. | 345/420 |

\* cited by examiner

*Primary Examiner* — Tize Ma
(74) *Attorney, Agent, or Firm* — Kilpatrick Townsend & Stockton LLP

(57) ABSTRACT

A method for a computer system for inspecting an animation sequence having a series of specified poses of an animated character includes receiving a mathematical performance style model associated with the animated character, receiving the series of specified poses of the animated character, each specified pose comprising respective values for the plurality of animation variables, determining an associated quality factor for each specified pose in response to the respective values for the plurality of animation variables and in response to the mathematical performance style model associated with the animated character, and providing feedback to a user in response to an associated quality factor for at least one specified pose.

21 Claims, 8 Drawing Sheets

METHODS AND APPARATUS FOR PERFORMANCE STYLE EXTRACTION FOR QUALITY CONTROL OF ANIMATION

BACKGROUND OF THE INVENTION

The present invention relates to extraction of performance style models from source performance data of objects. More specifically, various embodiments relate to automatic methods for determining performance style models of objects based upon performance data of such objects. Various embodiments also relate to controlling models of objects based upon the performance style models of the objects.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation/computer generated imagery (CGI) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007) and others. In addition to creating animated features, Pixar developed computing platforms specially designed for computer animation and CGI, now known as RenderMan®. RenderMan® is now widely used in the film industry and the inventors of the present invention have been recognized for their contributions to RenderMan® with multiple Academy Awards®.

One core functional aspect of RenderMan® software was the use of a "rendering engine" to convert geometric and/or mathematical descriptions of objects into images or that are combined into other images. This process is known in the industry as "rendering." For movies or other features, a user (known as an animator) specifies the geometric description of objects (e.g. characters) by specifying poses and motions for the objects or portions of the objects. In some examples, the geometric description of objects includes a number of animation variables (avars), and values for the avars. For purposes herein, such data can be termed "performance data."

An issue contemplated by the inventors of the present invention is that once an original feature (e.g. a movie, a short, etc.) has been completed, the original performance data is seldom, if ever, used again. In cases where a sequel to the feature, or the like is desired, an animator (typically different from the original animator) must specify new performance data to animate the object. However, the animator may be constrained such that the physical behavior of the object in the sequel should mimic the physical behavior of the object (i.e. the object must have the same characteristic motions) in the original feature. To do this, the animator may have to study the original feature and guess how to set the values for the avars to duplicate the "signature" movements of the object.

Drawbacks to such techniques include that much trial and error effort may be wasted by the animator to re-create the unique movements of objects. Another drawback includes that it is often impossible to determine coordinated changes in values of avars that result in the unique movements of objects.

Another problem contemplated by the inventors of the present invention is how to control physical representations of animated objects (animatronics units) so that the animatronics units moves in the same way as the object in the original feature. The use of "animatronics units," or electronically-controlled mechanical devices for live entertainment purposes, was pioneered by The Walt Disney Company. Animatronics characters have been used in many attractions (e.g. theme parks, rides, performances), such as Captain Jack Sparrow in the "Pirates of the Caribbean" attraction, President Lincoln in "Great Moments with Mr. Lincoln," and many others.

Current animatronics units typically provide a number of controls for a user (animatronics controller/performer) to manipulate physical portions of the units. For example, the user may control the mouth of a character, the eyebrows of a character, the eyelids of a character, the ears of a character, and the like. However, these controls are typically independent from each other.

Drawbacks to such techniques includes that a controller/performer often has no guidance how to coordinate movements of the animatronics unit such that it performs "correctly" ("on model") with respect to the object in the original feature. For example, the performer may make an animatronics unit of a character smile, but may not be aware that the character in the original feature always winks when the character smiles. Accordingly, the performer must not only study and remember characteristic movements of the character, but, the performer should not make "off model" movements.

In light of the above, what is desired are methods and apparatus that address many of the issues described above.

BRIEF SUMMARY OF THE INVENTION

The present invention relates to extraction of performance style models from source performance data of objects. More specifically, various embodiments relate to automatic methods for determining mathematical performance or mathematical visual style models of objects, such as animated objects, humans, or other tangible or intangible objects, based upon performance (e.g. poses, movement) data of such objects. Various embodiments also relate to posing and/or moving of models of objects based upon input performance data and the performance style models of objects.

In various embodiments of the present invention, source animation data, including values of animation variables associated with an object is obtained. In some embodiments, the source animation data may be from an animated feature, or the like. In response to the source animation data, a "performance style model" (visual style model) representing characteristic movements or poses of the object are mathematically extracted.

Subsequently, a user may input values for only a subset of the animation variables of an object. Next, based upon these values and the performance style model, output values for animation variables can be determined. The object may then be animated based upon the output values for the animation variables. Because the performance style model models the characteristic poses and motion of the object, the resulting movement or poses of the animated object will appear similar to the source animation data.

In other embodiments, the performance style may be applied to real-time animation or animatronics units. In such embodiments, a user may again input values for only a subset of the animation variables or movement variables of an object. Next, based upon the input values for the subset of animation variables or movement variables and the performance style model, output values for animation variables or movement variables can be determined.

In cases of real-time animation, the object may be animated by the computer. In cases of driving animatronics units, control signals may be determined from the output values for animation variables and applied to the animatronics units. Similar to the above, because the performance style model models the characteristic poses and motion of the object, the resulting movement or poses of the animated object or animatronics unit will appear similar to the source animation data.

According to one aspect of the invention a method for a computer system for inspecting an animation sequence comprising a series of specified poses of an animated character is described. One method includes receiving a mathematical performance style model associated with the animated character, and receiving the series of specified poses of the animated character, each specified pose comprising respective values for the plurality of animation variables. A technique includes determining an associated quality factor for each specified pose in response to the respective values for the plurality of animation variables and in response to the mathematical performance style model associated with the animated character, and providing feedback to a user in response to an associated quality factor for at least one specified pose.

According to one aspect of the invention a method for a computer system including a processor and memory is described. One method includes receiving a specification of a plurality of poses associated with an animated character in the memory, wherein each pose from the plurality of poses is associated with a respective plurality of training values for a plurality of animation parameters associated with the animated character. A process may include mathematically determining a visual style model associated with the animated character with the processor in response to the plurality of poses associated with the animated character, wherein the visual style model is configured to receive an input pose, wherein the input pose is associated with a plurality of input values for the plurality of animation parameters associated with the animated character, and wherein the visual style model is configured to determine a pose quality in response to an input pose, and storing the visual style model in the memory.

According to one aspect of the invention a computer program product for a computer comprising a processor and a memory, wherein the computer program product comprises computer-executable code resident on a tangible media is described. One computer program product may include code configured to direct the processor to receive a specification of a plurality of poses associated with an animated character, wherein each pose from the plurality of poses is associated with a respective plurality of training values for a plurality of animation parameters associated with the animated character, and code configured to direct the processor to mathematically determine a visual style model associated with the animated character with the processor in response to the plurality of poses associated with the animated character, wherein the visual style model comprises. The computer program product may include code configured to direct the processor to receive an input pose, wherein the input pose is associated with a plurality of input values for the plurality of animation parameters associated with the animated character, code configured to direct the processor to determine a pose quality in response to an input pose; and code configured to direct the processor to store the visual style model in the memory. The tangible media may be an optical media, magnetic media, printed media, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
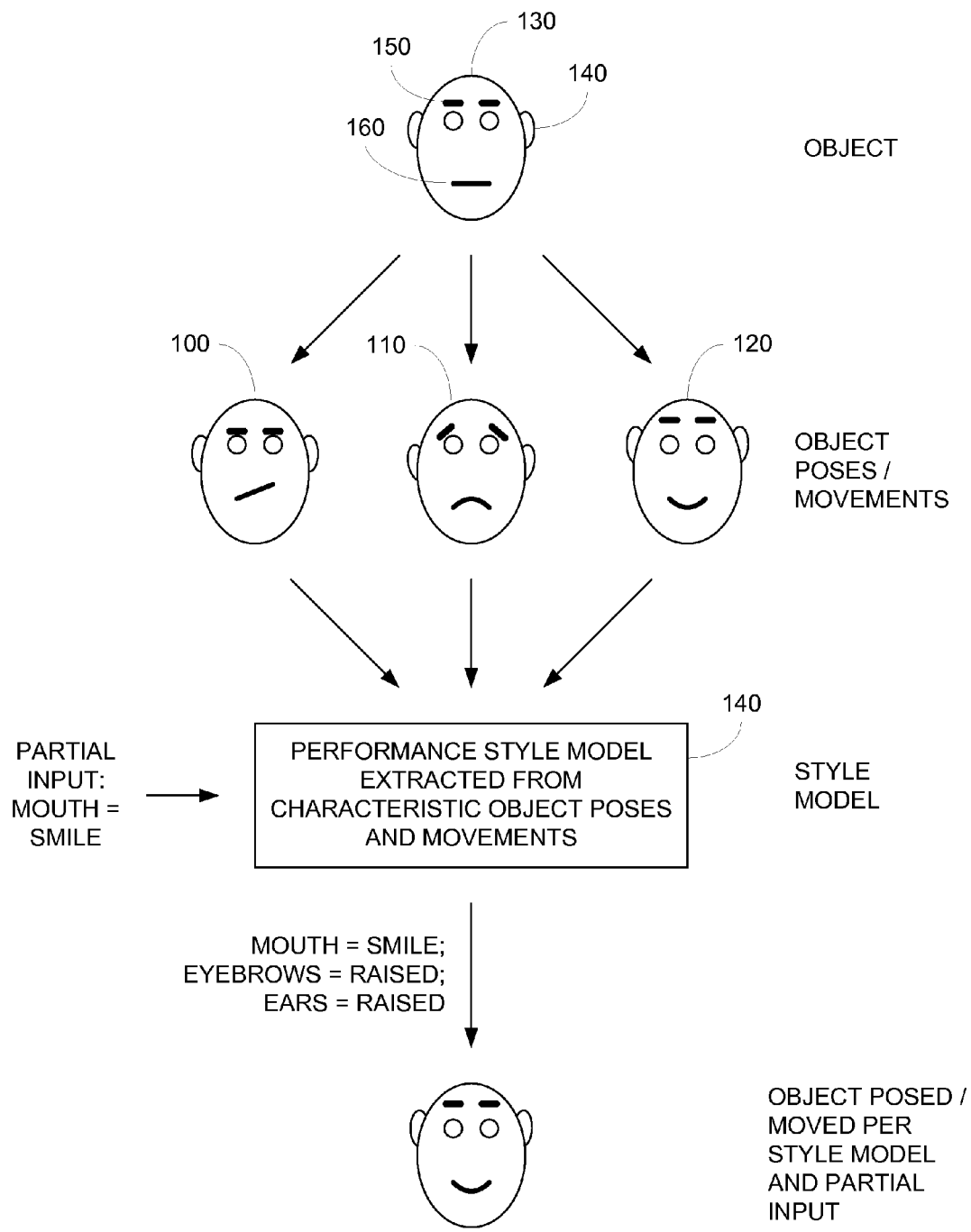
FIG. 1 illustrates an example according to various embodiments of the present invention.

FIG. 1 illustrates an example according to various embodiments of the present invention. In this example, a series of poses, pose 100, pose 110, and pose 120 of an object 130 are illustrated. As will be discussed below, the object 130 may represent a software model in computer memory, a physical object (e.g. a live actor), or the like.

In FIG. 1, a default or rest pose for object 130 is shown. As such, ears 140, eyebrows 150, and mouth 160 are in "neutral" positions. Pose 100 represents a "thinking" pose for object 130 where ears 140 are not moved, eyebrows 150 drop, and mouth 160 is put into a grimace. As illustrated in pose 110, a "sad" pose, ears 140 are positioned lower on the face, portions of eyebrows 150 drop, and mouth 160 is put into a frown. As illustrated in pose 120, an "excited" pose, ears 140 are positioned higher on the face, eyebrows 150 are raised, and mouth 160 is put into a smile. In various embodiments, pose or motion data associated with poses 100, 110, and 120 may be based upon animation data, physical motion capture data, and the like. As an example of the former case, an animator may specify values for animation variables for a character, and as an example of the latter case, an actor motions are captured using motion capture equipment.

In various embodiments of the present invention, the pose or motion data associated with poses 100-120 any used to determine a performance style model 170, associated with object 130. More specifically, poses 100-120 may be used to represent typical or characteristic poses/motion for object 130, ("on model" poses/motions). Accordingly, in various embodiments, performance style model 170, represents a mathematical model of the characteristic poses or motions for object 130.

In various embodiments, subsequent to the above processes, a user provides one or more input pose or motion data 180 to performance style model 170. In some embodiments, input pose or motion data 180 are a subset of the pose or motion data associated with poses 100-120. As illustrated in FIG. 1, for example, input pose or motion data 180 may be used to specify a smile for mouth 160.

As can be seen in FIG. 1, in response to input pose or motion data 180, in various embodiments, using performance style model 170, output pose or motion data 190 are determined. In this example, based upon a smile for mouth 160, performance style model 170 may automatically determine that the positions of ears 140 and eyebrows 150 should be elevated on the face to stay "on model." In some embodiments, output pose or motion data 190 may or may not also include input pose or motion data 180.

In various embodiments of the present invention, output pose or motion data 190 are provided to move an object into a pose 195. In various examples, output pose or motion data 190 may be used to specify pose 195 for a computer-animated object; output pose or motion data 190 may be used to specify pose 195 for an animatronics unit (performance robot); output pose or motion data 190 may be used to specify pose 195 for simulation/computations, or the like.

Figure 2:
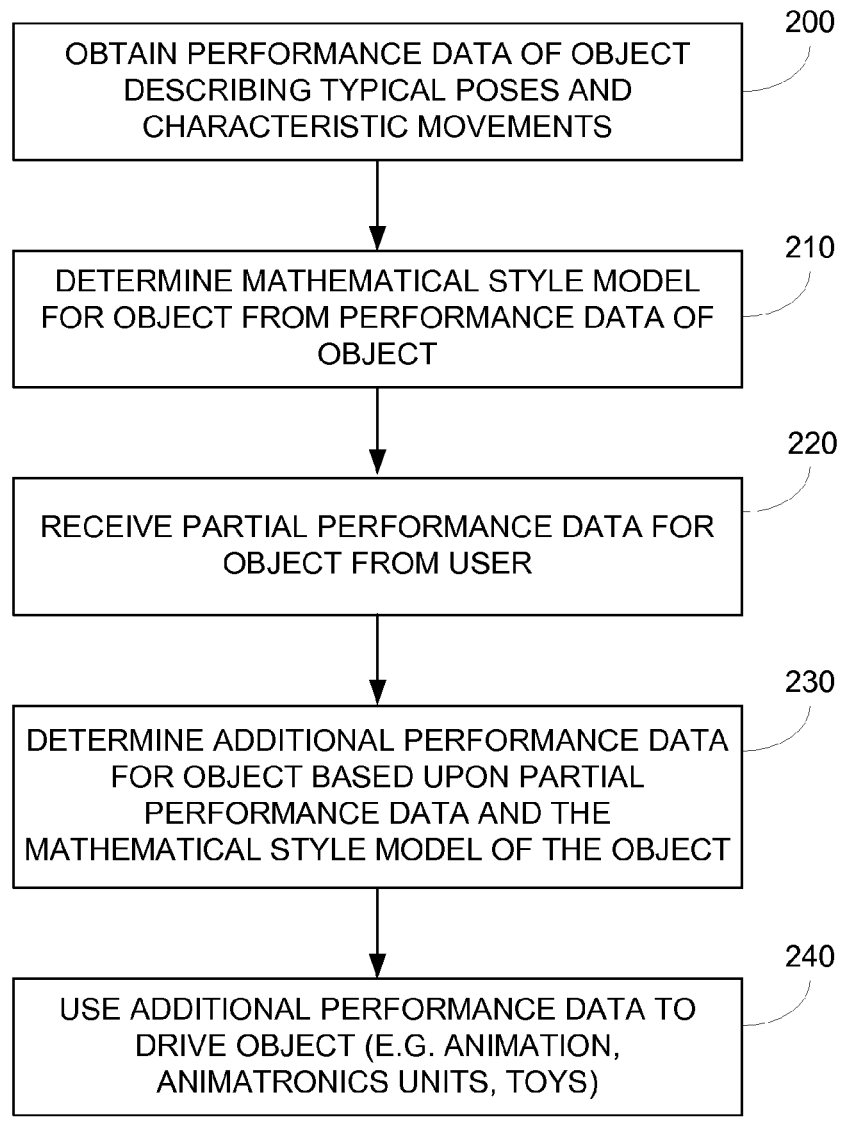
FIG. 2 illustrates a flow diagram according to various embodiments of the present invention.

FIG. 2 illustrates a flow diagram according to various embodiments of the present invention. Initially, target or characteristic performance data for an object may be obtained, step 200. In some embodiments of the present invention, the object may be a CGI character in computer animation or live action sequence. For example, the object may be a character such as Crush the Turtle from "Finding Nemo" (2003), Beowulf from "Beowulf" 92007), or the like.

In some embodiments, the sequence and the associated performance data may be selected by a user. For example, a user may select the entire feature as a source of the performance data; alternatively, the user may select a portion of the feature as the source of the characteristic performance data, e.g. a "shot" within the feature, a "sequence" within the feature, or the like. As illustrative examples, one sequence may be limited to where the character Dash is running in the movie "Incredibles" (2005); one sequence may be after the character Violet gets her confidence; or the like. In other embodiments, the performance data may be specially computed performance data for an object, e.g. a "training set" of performance data.

In various embodiments of the present invention, the performance data may represented by a series of values for animation variables of the object, a series of parameters used to determine values for animation variables of the object, a series of meta data values (e.g. mood of the character, costume of the character, etc.), or the like. As merely an example, animation variables associated with a hand may have static animation variables, for example, the lengths of the digits in the hand, and may have dynamic animation values, for example, the angles formed by fingers, and the like.

In some embodiments of the present invention, the performance data may be derived from physical motion capture devices. For example, an actor may be placed in a body suit with a number of reflective dots, the face of the actor may be painted or affixed with reflective dots, or the like. In operation, the location of the reflective dots are tracked by cameras while the actor physically "performs" (e.g. gestures) with their body, face, etc. In various embodiments, motion capture devices, such as available from Vicon, or the like, map the images of the dots captured by the cameras to positions and motions. In various examples, the performance data includes the positions and motion of points of the object in three-dimensional space. Merely as an example, performance data may include the location of the actor's hands as the actor is performing "jumping jack" exercises; performance data may include the displacement of an actor's cheeks as the actor is smiling; and the like. Similar to the above embodiments, the performance data that is selected by a user may be the motion capture data of the actor through out a range of motions (e.g. a scene), or a portion thereof (e.g. only smiling, only frowning).

In FIG. 2, one or more mathematical models are derived from the performance data for the object, step 210. In various embodiments, a performance style model is extracted from the performance data obtained in step 200, above. In various embodiments, as will be described further in conjunction with FIG. 3, the performance style model includes mathematically derived interrelationship between the performance data for the object. In the example in FIG. 1, performance style models 170 were shown. In various embodiments, the performance style model may be termed: a movement model, an animation style model, a data relationship model, a spectral response model, a behavioral animation model, or the like, depending upon specific application of the principles described herein.

In various embodiments, steps 200 and 210 may be performed at different times from each other and from steps 220-240, in FIG. 2. For example, the specification of the pose (e.g. motion) data may be performed by an animator when animating for a feature (e.g. movie, short, etc.); or may be captured from an actor when performing motion capture for a feature (e.g. movie, short, etc.). The steps for determining the performance style model may then be performed at a later time (e.g. well after the feature is complete). For example, step 200 may be performed months or years before determining performance style models in step 210 is performed. Similarly, step 210 may be performed months or years before steps 220-240 are performed, in various embodiments.

In various embodiments of the present invention, the performance data and the corresponding performance style model may be based upon an entire object. In other embodiments, separate portions of an object may have their own associated performance style models. For example, the face of a character may have a performance style model; the posture of the character may have a performance style model; the arms may have a performance style model; and the like. In light of the present invention disclosure, it should be understood that performance style models may be use to characterize poses/motions of an entire object or portions thereof.

Next in some embodiments of the present invention, a user may specify a set of input performance data, step 220. In various embodiments, the set of input performance data is typically a subset of the performance data input in step 200. As an example, if the performance data input in step 200 includes values for 1,000 animation variables, the set of input performance data in step 220 may be values of less than 1,000 animation variables (e.g. 10, 50, 100, 500, or the like).

In various embodiments, the user in step 220 may be different from the animator/actor in step 200. For example, the user in step 200 may be an animator, an animation performer, an animatronics controller, or the like. In contrast, the user that provides the input performance data in step 220, may be performing this action years after step 200, above.

In one set of embodiments, the user in step 220 is an animator or an animatronics performer who is specifying animation for an object, for a new animated feature (e.g. movie, short, trailer) or for a real-time performance. As an example, the user may be an animator tasked with animating an object (e.g. a character) for a movie sequel, for a television series, television appearance (e.g. Academy Award™ presenter, a commercial, talk show guest, or the like); animating for an interactive electronic exhibit (e.g. animated interactive character); or the like. In some embodiments, instead of the user specifying values for the entire set of animation variables, the user may specify values for a subset of animation variables. For example, the user may specify a "happy" mood; the user may specify a character clapping hands together; the user may select an "answer" to a guest (e.g. customer) question; or the like.

In another set of embodiments, the user is an animatronics controller controlling a physical live-performance machine (an "animatronics unit") to provide real-time performances for an audience. As an example, the user may be a controller controlling the legs of an animatronics unit; the user may be controlling the neck of an animatronics unit; the user may be a controller specifying moods for the animatronics unit; or the like. In various embodiments, real-time performances may include a stage performance of the animatronics unit; an animatronics unit performing in the midst of a crowd; an animatronics unit performing for an attraction or a ride; or the like.

In FIG. 2, based upon the performance style model(s) of the object, as well as the set of input performance data, output performance data are determined, step 230. In various embodiments, the output performance data include data that may be used to control the object.

In various embodiments directed to software animation, the output performance data may include values for animation variables for the object. In some instances, values for all animation variables for the object are specified by the output performance data. In other instances, the object may have default values for animation variables, and the output performance data may be values for only animation variables that change from their respective default values. As merely an example, in step 220, a user may specify a "sad" mood and a movement path for an object. Next, by using the performance style model, values for animation variables may be determined (with respect to time) to specify the object moving (e.g. walking) along the path in a "sad" manner. As another example, in step 220, the user may specify an object flapping its arms like a bird an input performance data, and in response, the output performance data may specify values for animation variables that cause the object to elongate its neck and flap its arms.

In various embodiments directed to physical animatronics units, the output performance data may include driving values for various components of the animatronics units, such as pneumatic pumps, hydraulic pumps, electric voltages, digital control signals, and the like. As an example, in step 220, a user may specify that the animatronics unit moves quickly to a particular location (e.g. via joystick). As merely an example, the output performance data may specify a spin rate for a car tire, may specify smoke output from a smoke machine, may specify lateral movement for the rear end of a car, or the like.

In FIG. 2, the output performance data are next applied to the object, step 240. In some embodiments of the present invention directed towards computer animation, the output performance data may be associated with the animated feature (e.g. movie, short, trailer) and stored in a computer memory. Subsequently, during a rendering phase of the animated feature, the output performance data may be retrieved and used as values for animation variables. As a result, a rendering of the object is determined for one or more images. These rendered images may then be stored in a variety of forms, and then be displayed to a variety of users (e.g. audience, home viewer).

In various embodiments, the output performance data may be modified by a user before being used as values for animation variables. In such cases, a user (e.g. animator) may decide to make changes to the values for the animation variables specified by the output performance data. For example, the user may determine that the output performance data does not properly reflect the desired characteristic performance of the object; the user may determine that the object performance data specifies a pose/motion that is not artistically acceptable; the user may determine that the object performance data specifies a motion that needs to be better combined with motions that are before or after this motion in time; and the like.

In some embodiments where real-time computer animation is desired, the object performance data may be applied to a real-time rendering engine, possibly in conjunction with a graphics processing unit, or the like, in order to output an image in real-time. In various embodiments, a display for a user may include an LCD display, Plasma display, DLP display, a projection display, or the like. In such embodiments, the real-time rendering of the performance of the object is displayed to a user, typically for entertainment purposes. As an example, the real-time rendering may represent a character in feature (e.g. Wal-E from "Wal-E" (2008)) interacting with users, e.g. the character answering questions and/or physically gesturing in response to the user's requests, or the like.

Some embodiments of real-time computer animation may be implemented on computer-based software, such as games, on various hardware platforms (e.g. PC, XBOX 360, WII, PS3, PSP, Nintendo DS, or the like). In such embodiments, as described above, the performance style model may be determined in step 210, and the user in step 220 may be a player of a game. During playing of the game (e.g. entertainment game, edutainment software, virtual world software, or the like), the game player enters input performance data with a controller, or the like. In some embodiments, the input performance data may include striking a key on a keyboard, waiving around a controller, hitting buttons on a controller, stepping upon a floor mat controller, moving within a field of view of a camera, shouting commands out loud, moving a joystick or steering wheel, or the like. Other types of inputs devices are also contemplated to be used within embodiments of the present invention. In various embodiments, the output performance data (determined by the input performance data and the performance style model) are determined and then used to generate real-time animation for the computer user. For example, the real-time animation may include an animated character moving or gesturing in a way similar to the way the animated character moves or gestures in a movie.

In some embodiments of the present invention, additional inputs that may be input into the performance style model may include "properties of the object, (e.g. character) for animation, for a game, or the like. In various embodiments, a number of mathematical performance or visual style models would be specified or determined based upon the properties of the object in the environment. For example, a character may behave in a certain style if the character is happy, and another style if the character is sad; the character may behave in a certain style if it is day and another style if it is night; and the like. Such metadata may be recorded and provided in addition to the training movement data. Some exemplary examples are described below, but should not limit the scope of various embodiments of the present invention. It is contemplated that one of ordinary skill in the art would understand that many other types of properties can be used as input for determining a visual style of movement.

One property may be physical proximity of the character to other physical object in the environment, such as a swooning style behavior when the character is close to a loved one (e.g. movement leading with the head), a repulsed style behavior when the character is close to a dirty diaper, (e.g. movement of the head far away from the object), etc. In another example, audio input can be used (e.g. a scared movement style in response to in-game sounds such as gun fire, such as eyes wide open with darting glances), an embarrassed movement style in response to user-input sounds such as laughing (e.g. down cast eyes), etc. In another example, a style of music being played by the game or input by a user may affect behavior, such as a "Joe Cool" style of movement when B. B. King is played (e.g. head upturned), a dancing style of movement when disco music is played (e.g. arms close to the chest with shoulder movement), etc. In another example, the loudness of music or sounds played by the game or input by the user may be used, such as a scared movement style after a loud clap of thunder (e.g. nervous head side to side motions), a determined movement style in response to a user yelling commands (e.g. a head down furrowed brow), etc. In another example, the recognized spoken commands by the game or by a user may be used as input, such as a "take cover!" command making an in-game characters assume a very cautious movement style (e.g. slow, tentative movements), a "dance!" command making the in-game characters move in a dancing manner, etc.

In another example, an amount of illumination incident upon the in-game character may be used as input, such as a cautious movement style for the character when entering a dark area (e.g. leading with the head peering side to side), a squinting movement style when the character is in a brightly lit area (e.g. walking with hands shielding their eyes), etc. In another example, the type of surface the character is upon may be used as input, such as quick jittery movement style when walking on hot coals (e.g. arms held in front close to chest), slow cautious movement style when walking on loose gravel (e.g. arms held outwards for balance purposes), plodding movement style when walking in mud (e.g. large head and shoulder movement leading the feet position), etc. In another example, temperature within the game, or the like may be used to determine movement style, such as shivering movement style if it is cold (e.g. arms folded across chest), a listless movement style if it is hot (e.g. arms to side, head swaying back and forth), etc. In another example, impairment of the in-game character may affect the movement style, for example, if injured, the character may move slowly (e.g. injured leg causing a character limp), etc.

In other examples, a mood of the character may affect style of movement, for example, a jumpy style of movement when the character is happy (e.g. elbows close to chest, waiving hands), a sad style of movement when the character is sad (e.g. droopy head, down cast eyes), etc. In other examples, the time of day, week, season, year, or the like may be used to determine movement style of the character, such as a sleepy style when early in the morning (e.g. squinting eyes), an excited movement style for the character when it is close to a birthday (e.g. energetic actions, attentive response), a slow movement style for the character on Mondays (e.g. slow actions, slow response to stimulus), etc.

The above examples may also be used as inputs to physical object embodiments of the present invention, such as animatronics units, toys, robots, puppets, or the like. For example, an animatronics unit may be operated with an excited visual movement style, when meeting a theme park guest (e.g. slightly shivering, hands held together by chest). As another example, when a doll-type toy is not being held, the doll may move in an agitated movement style (e.g. arms quickly flailing), and if the doll is held, the doll moves in a contented movement style (e.g. small slow motions). In various embodiments such as a toy, the physical object is a self-contained unit, the toy may receive any of the above inputs, and in response determine a style of movement. Next, based upon the style of movement, the toy moves or is posed according to that determined style.

In embodiments directed towards physical performance "robots," machines, toys, or the like, the output performance data may be used to determine driving values that are applied to pose or move the animatronics unit. In some embodiments of the present invention, construction of the animatronics unit may be influenced by the animation or motion capture data input in step 200, above. Additionally, the relationships between the output performance data and the driving values may be adjusted depending upon software simulation or direct observation of performance of the animatronics unit. Further disclosures of such processes can be found in the applications cross-referenced above.

In various embodiments, the animatronics units is then posed or moved according to the driving values for the entertainment of a user (e.g. audience member). As examples, the animatronics units may shake the hand of a guest in a manner consistent with the performance data in step 200; the animatronics unit may move (e.g. dance, walk) with a characteristic ("on model") movement of the object; or the like. In light of the present disclosure, one of ordinary skill in the art would recognize that other characteristic types of movement or poses may be reflected by an animatronics unit.

Figure 3:
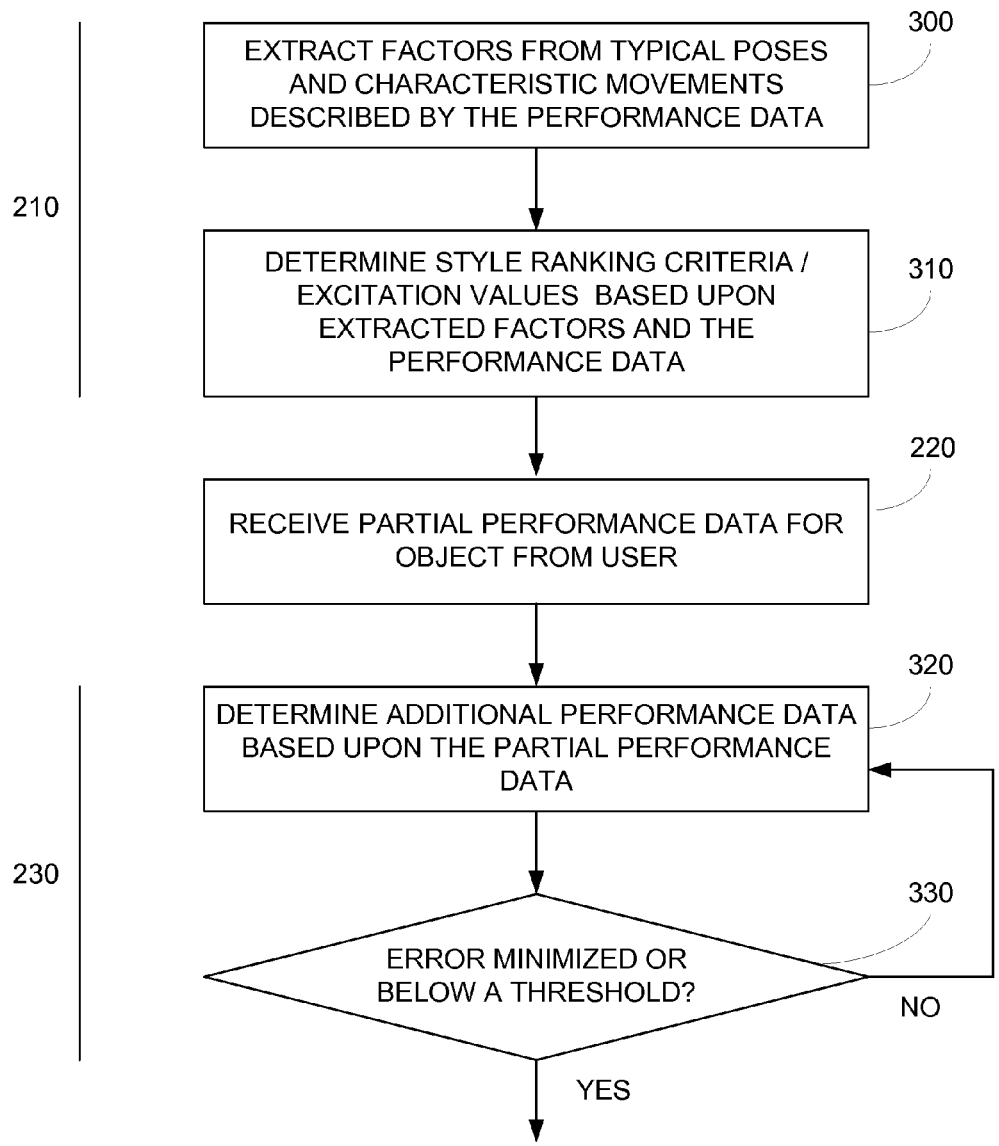
FIG. 3 illustrates a flow diagram according to various embodiments of the present invention.

FIG. 3 illustrates a flow diagram according to various embodiments of the present invention. More specifically, FIG. 3 illustrates a more detailed description of various portions of FIG. 2.

In FIG. 3, initially, factors are extracted from the performance data (step 210), step 300. In operation, a set of training poses (performance data) is represented as Xi(t) where X is the value of an appropriately scaled ith (of m) movement parameters (e.g. animation variable, motion capture parameter). Based upon this definition, a set of factors Pij and qj(t) can be computed such that:

$$X_i(t) = \sum_{j=1}^{N} P_{ij} q_j(t) + Err_i(t)$$

In this relationship, N is a truncation value and P's and q's are chosen to minimize the error:

$$\text{Min} \sum_{i=1}^{M} \int_{t} Err^2(t) dt$$

In some embodiments, techniques such as single value decomposition (SVD) may then be used to solve these relationships. Additionally, in various embodiments, a free scaling parameter is selected such that for all i:

$$\int q_i dr = 1$$

In various embodiments, the P's represent performance style models, or condensed performance style information based upon the performance data provided in step 200.

Next, in step 310, the determined styles are ranked (step 200), step 310. More specifically, for a given performance data pose $g_i$, $g_i$ can be approximated by the following equation:

$$g_i = \sum_{j=1}^{N} P_{ij} l_j$$

In this relationship, l's are excitation values.

In various embodiments of the present invention, for a typical characteristic (e.g. "on model") pose for the object, $|l_i|$ is expected to be roughly constant with i. In contrast, atypical (e.g. "off model") poses of the object will generally have large $|l_i|$ some values of i.

In various embodiments, a figure of merit "Q" is then defined that has a small value for good "on model" poses and has a large value for "off model" poses:

$$Q = \frac{\sum_{j=1}^{N} l_j^2}{\sum_{i=1}^{M} g_i^2}$$

Accordingly, in some embodiments, a fully described pose may be input into the above relationship to determine whether the fully described pose is close to ("on model") the performance style model. As described above, for poses that have a different style (e.g. off model) $|l_i|$ may be large for some values of i; and for poses that have a very similar style (e.g. on model) may be large for some values of i.

In various embodiments of the present invention the data provided in step 220 is used in steps 320 and 330 (step 230), implementing the above relationships to determine output performance data based upon (partial) input performance data. More specifically, in some examples, $g_i$ is known for only some values of i, as specified or as determined by the input performance data in step 220. As described above, embodiments of such cases may be for real-time animatronics units control, for real-time computer animation, or for other cases where a subset of performance data is specified. In various embodiments, this is represented by:

$$g_{i\,subset} \rightarrow g_i \text{ such that } Q \text{ is small or minimized.}$$

In various embodiments, values of g that are not determined by the subset of performance data are determined, step 320, such that Q is as small, step 330. In some embodiments, Q may be as small as possible, may be under a threshold, or the like. In some embodiments, a spectral matching process may be used for steps 320 and 330. In other embodiments, any method for determining values such that Q is small or minimized are contemplated, such as a likelihood approximation function, any generic sparse input function that attempts to minimize or reduce output differences, or the like.

Figure 5:
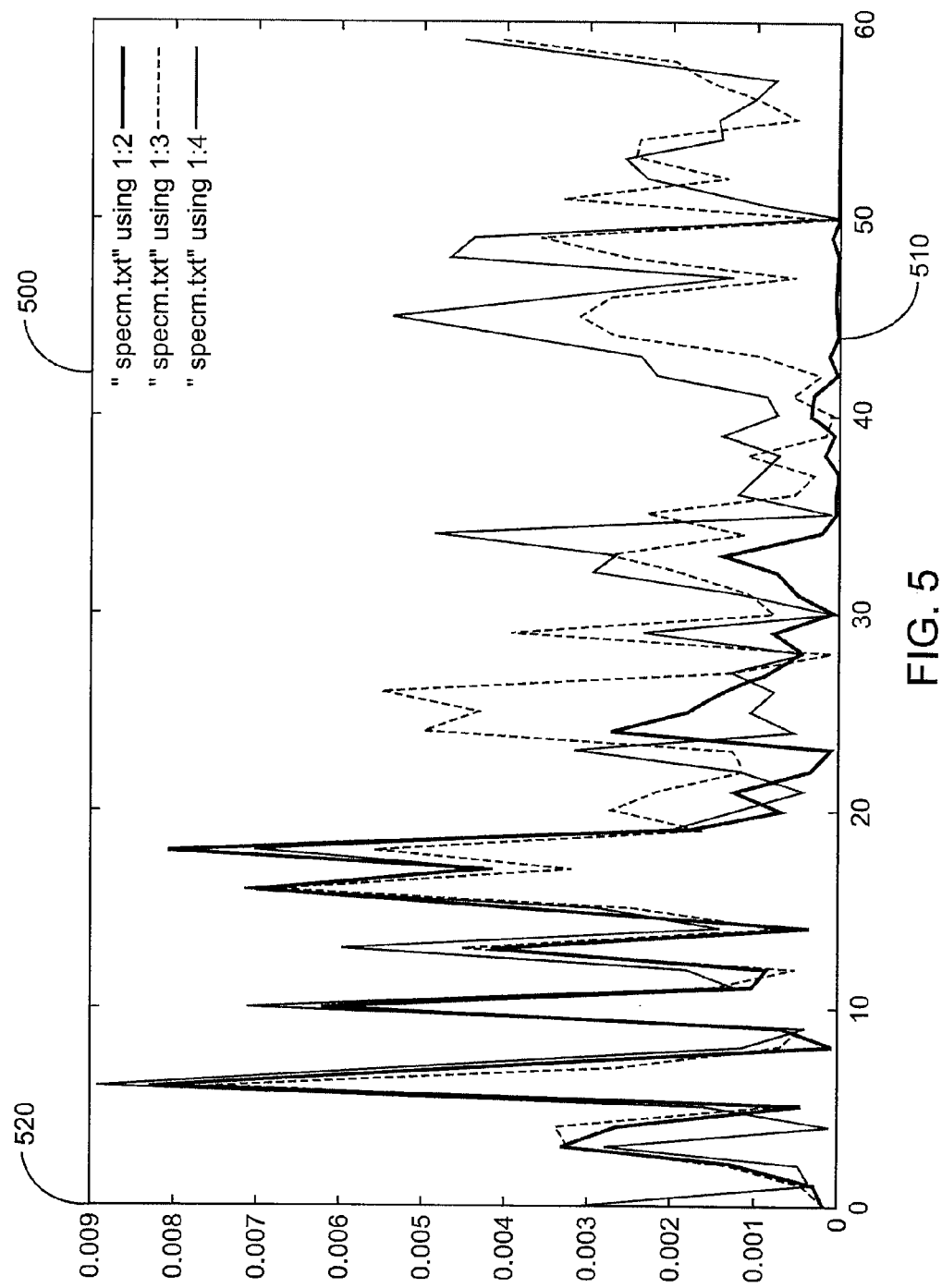
FIG. 5 illustrates an example according to various embodiments of the present invention.

FIG. 5 illustrates an example according to various embodiments of the present invention. More specifically, FIG. 5 illustrates an example of a spectral matching process. FIG. 5 illustrates a graph 500 where modes from a vector decomposition of a pose are illustrated on a horizontal axis 510 and weights are illustrated on the vertical axis 520.

In this example, the red line 530 represents a pose specified by approximately 50% of animation variables for an object, using the visual style mode described above. The green line 540 represents a pose specified by approximately 33% of the animation variables for the object, using the same visual style model. Additionally, the blue line 550 represents a pose specified by approximately 25% of the animation variables for the object, using the same visual style model. As can be seen, for the first twenty modes, red line 530 and green line 540 specify very similar weights. Blue line 550 also somewhat tracks red line 530 for the first 20 some modes. However for higher-order modes, green line 540 and more significantly blue line 550 deviates from red line 540. This deviation implies that when using fewer input values into the visual style model, the output values are less similar to the desired output weights. Accordingly, the output pose specified will be further away from the desired style of pose.

Various embodiments of the present invention may be applied to arbitrary data structures derived from computer generated data or derived from physical measurements. As an example, a set of data, e.g. a point cloud representing a surface (e.g. face) of an object, may be directly or indirectly animated by an animator, or the like. Next, based upon the animation of the surface, a performance style model for the data set may be derived. Subsequently, based upon the performance style model, a user may specify partial animation data, such as a displacement of eyebrows from a first location to a second location on the face (for example, to show surprise). In response to the partial animation data, displacement values for other points of the surface, e.g. face, may be determined using various techniques described above. As a result, in one example, other portions of the face are then moved to represent a character opening their mouth in surprise, in a visual style consistent with the performance style model.

As another example of a data point cloud, the inventors of the present invention suggest movement for a school of fish may be modeled based with a point cloud. Based upon the animated motion, a performance style model for the school of fish can be determined. Later, a different user may specify that the school of fish swim on a specified path from a first rock to a second rock. Then, as described above, positions of each fish in the school of fish may be determined, based upon the performance style model, and the specified path from the first rock to the second rock. Using positions of all fish in the school, the school of fish may thus be animated in the proper style (e.g. "on model"), based upon the path of only one fish.

In contrast to flock-based animation systems previously proposed, movement of each elemental member of a flock need not be determined based upon complex behavioral models for each member at run-time (e.g. at animation time). Instead, in various examples of the present invention, the overall performance style model of the flock are computed before run-time. Then at run-time, very simple equations are evaluated to determine motion for each member of the flock.

Figure 4:
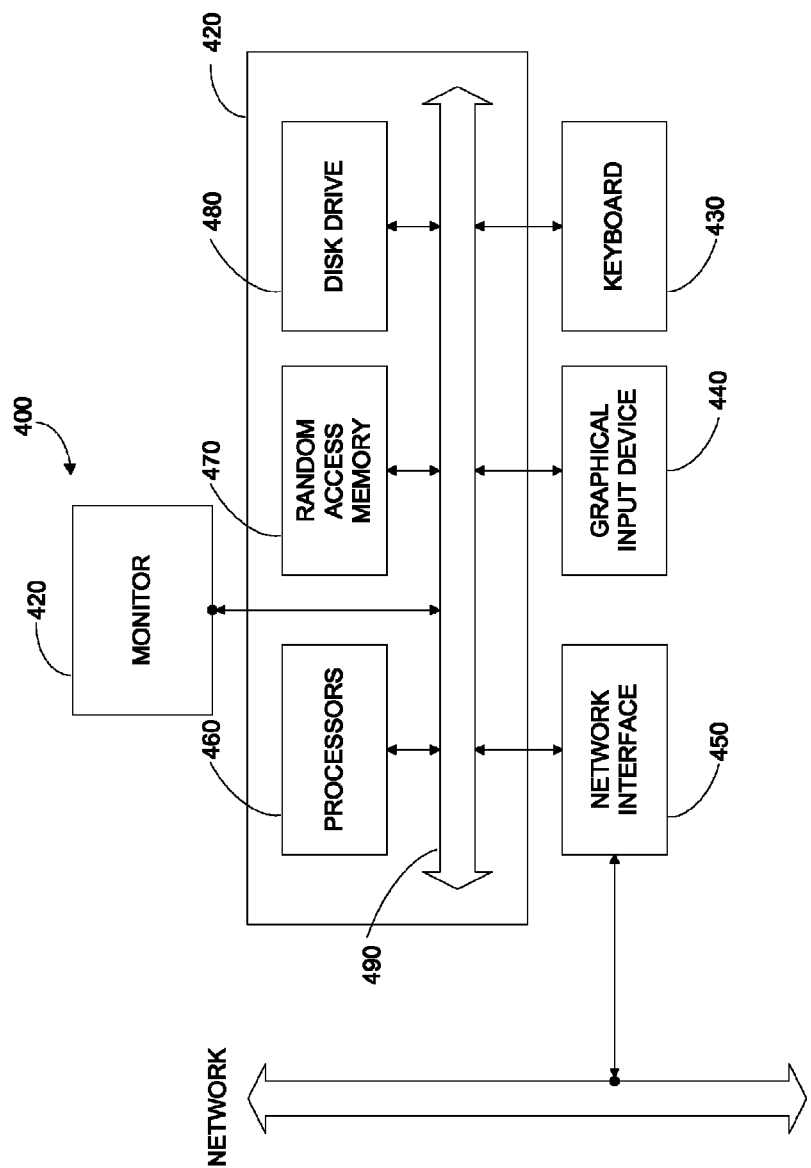
FIG. 4 is a block diagram of typical computer system according to an embodiment of the present invention.

FIG. 4 is a block diagram of typical computer system 400 according to an embodiment of the present invention.

In the present embodiment, computer system 400 typically includes a display 410, computer 420, a keyboard 430, a user input device 440, computer interfaces 450, and the like.

In various embodiments, display (monitor) 410 may be embodied as a CRT display, an LCD display, a plasma display, a direct-projection or rear-projection DLP, a microdisplay, or the like. In various embodiments, display 410 may be used to visually display user interfaces, images, or the like.

In various embodiments, user input device 440 is typically embodied as a computer mouse, a trackball, a track pad, a joystick, wireless remote, drawing tablet, voice command system, eye tracking system, and the like. User input device 440 typically allows a user to select objects, icons, text and the like that appear on the display 410 via a command such as a click of a button or the like.

Embodiments of computer interfaces 450 typically include an Ethernet card, a modem (telephone, satellite, cable, ISDN), (asynchronous) digital subscriber line (DSL) unit, FireWire interface, USB interface, and the like. For example, computer interfaces 450 may be coupled to a computer network, to a FireWire bus, or the like. In other embodiments, computer interfaces 450 may be physically integrated on the motherboard of computer 420, may be a software program, such as soft DSL, or the like.

In various embodiments, computer 420 typically includes familiar computer components such as a processor 460, and memory storage devices, such as a random access memory (RAM) 470, disk drives 480, and system bus 490 interconnecting the above components.

In some embodiments, computer 420 includes one or more Xeon microprocessors from Intel. Further, in the present embodiment, computer 420 typically includes a UNIX-based operating system.

RAM 470 and disk drive 480 are examples of computer-readable tangible media configured to store data such as geometrical descriptions of objects, ordered geometric descriptions of objects, procedural descriptions of models, values of animation variables associated with animation of an object (performance data), performance style models (described below), output performance data (described below), embodiments of the present invention, including computer-executable computer code, or the like. Types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit, GPU, may be used to accelerate various operations, described below. Such operations may include determining performance style models, determining output performance data, or the like.

FIG. 4 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Core™ microprocessors from Intel; Phenom™, Turion™ 64, Opteron™ or Athlon™ microprocessors from Advanced Micro Devices, Inc; and the like. Further, other types of operating systems are contemplated, such as WindowsVista®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In some embodiments, not all of the above computer components are required. For example, when integrated for control of a toy, a keyboard, a hard drive, a display, a network interface, or the like may or may not be included. In some embodiments, the computing system may be embodied in a toy, an animatronics unit, or the like. More specifically, the computing system may be a remote control for or embedded within a toy, an animatronics unit, a robot, or the like. Accordingly, many types of configurations for computational devices can be used to implement various methods described herein. Further, processing components having different levels of computational power, e.g. microprocessors, RISC processors, embedded processors, or the like can also be used to implement various embodiments.

In embodiments including motion capture functionality, computing systems from Vicon, Mova, Motion Analysis, and others, may be used.

Figure 6A:
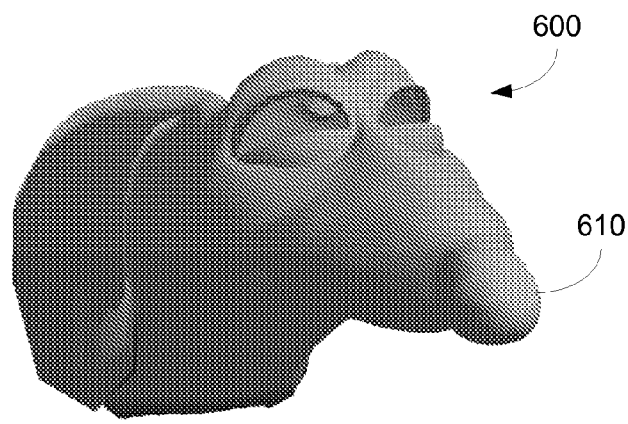
FIGS. 6A-C illustrate screenshots according to an example of an embodiment of the present invention.
Figure 6B:
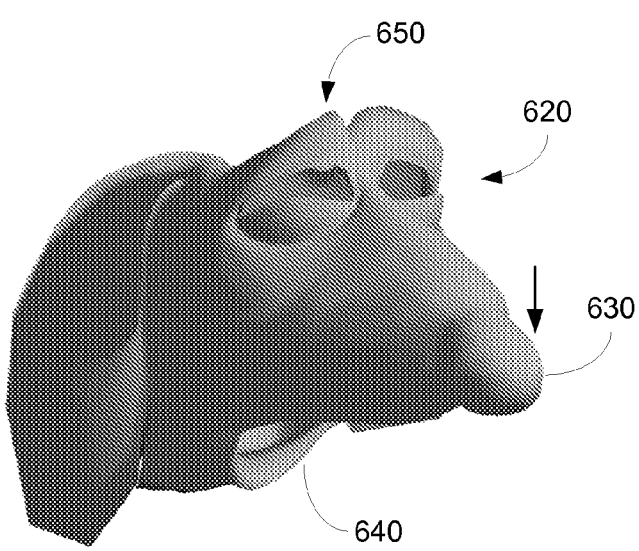
Figure 6C:
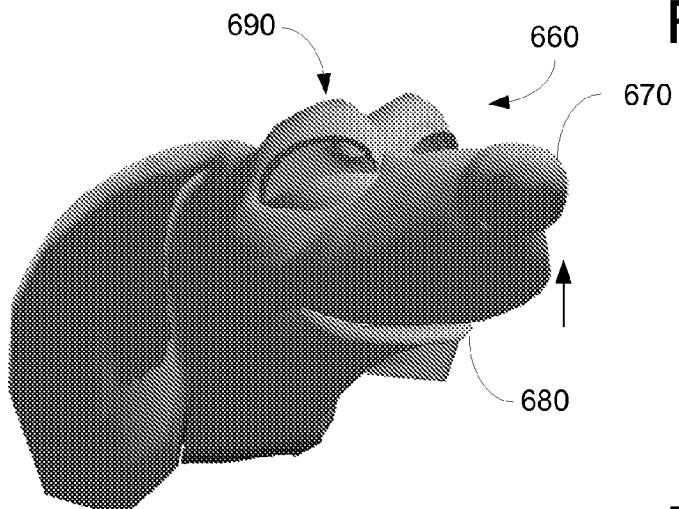

FIGS. 6A-C illustrate screenshots according to an example of an embodiment of the present invention. More specifically, in FIG. 6A, the character is posed in a default pose 600 and the muzzle is positioned in a default position 610.

In the example of FIG. 6B, the same character is posed in another pose 620 based upon a mathematical style model and an input. In this example, the input includes an animator specifying (graphically or numerically) a different position 630 for the muzzle. In FIG. 6B, the muzzle is pulled down, with respect to default pose 600. According to the mathematical style model, animation variables for the remaining portion of the character are then determined. After rendering, as can be seen, the mouth is automatically determined to be in an open position 630, and the shape 650 of the eyes and eyebrows become furrowed.

In the example of FIG. 6C, the same character is posed in another pose 660 based upon the same mathematical style model and a different input. In this example, the input includes an animator specifying (graphically or numerically) a different position 670 for the muzzle. In FIG. 6B, the muzzle is pulled down, with respect to default pose 600. According to the mathematical style model, animation variables for the remaining portion of the character are then determined. After rendering, as can be seen, the mouth is automatically determined to be in a closed position 680, and the shape 690 of the eyes and eyebrows 690 are different from shape 650.

As can be seen comparing FIGS. 6B and 6C, a simple manipulation of a single animation variable, may result in two very different output poses for the object, using the above-described mathematical style model.

Figure 7A:
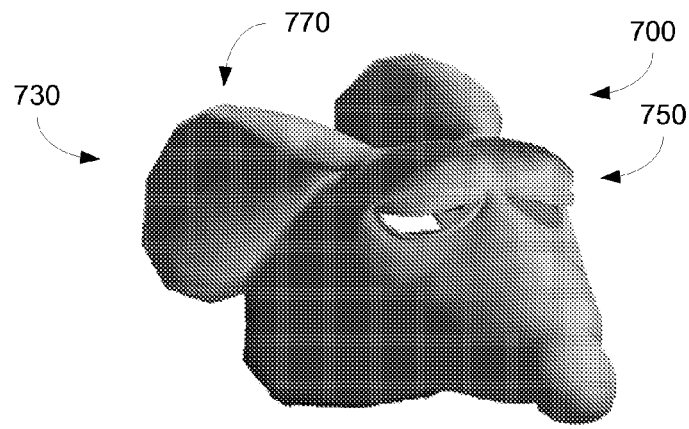
FIGS. 7A-C illustrate screenshots according to an example of an embodiment of the present invention.
Figure 7B:
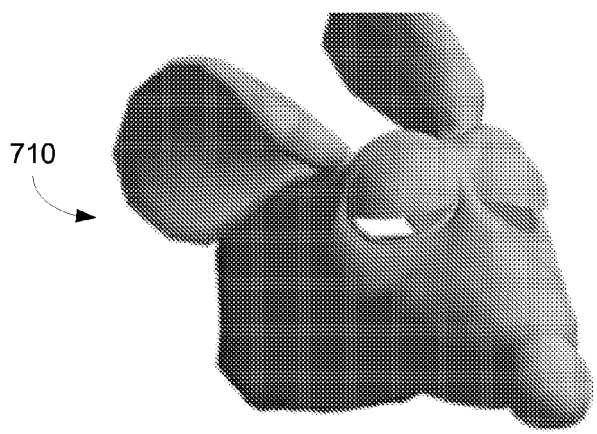
Figure 7C:
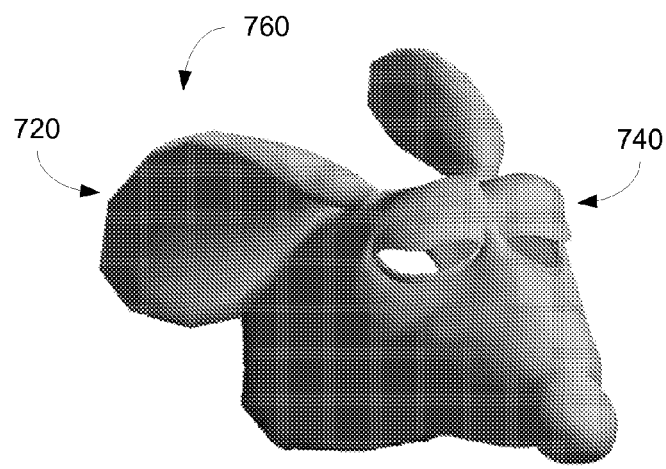

FIGS. 7A-C illustrate screenshots according to an example of an embodiment of the present invention. More specifically, in FIG. 7A, a character 700 is posed in a pose 730 fully specified by hundreds of animation variables. In the example of FIG. 7B, the same character is posed 710 using only six animation variables of the pose in FIG. 7A. As can be seen, pose 710 visually appears very different from pose 730.

In contrast, in the example of FIG. 7C, the same character is posed 720 using the same six animation variables as in FIG. 7B, but additional values for animation variables are determined by using a visual style model, as was discussed above. As can be seen, the character in pose 720 appears closer to pose 730 than pose 710. For example, the poses 740 of eye brows and eyelids are more similar to the desired poses for eye brows and eyelids 750, the droopy pose 760 of the ears are more similar to the desired pose 770, etc. In this example, although pose 720 is not necessarily identical to pose 730, the amount of input data required for pose 720 is dramatically decreased.

Figure 8A:
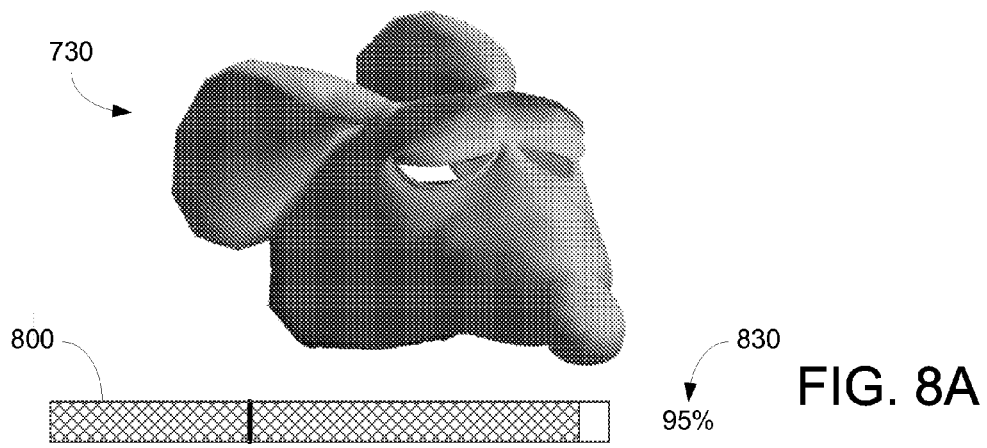
FIGS. 8A-C illustrate an example according to various embodiments of the present invention.
Figure 8B:
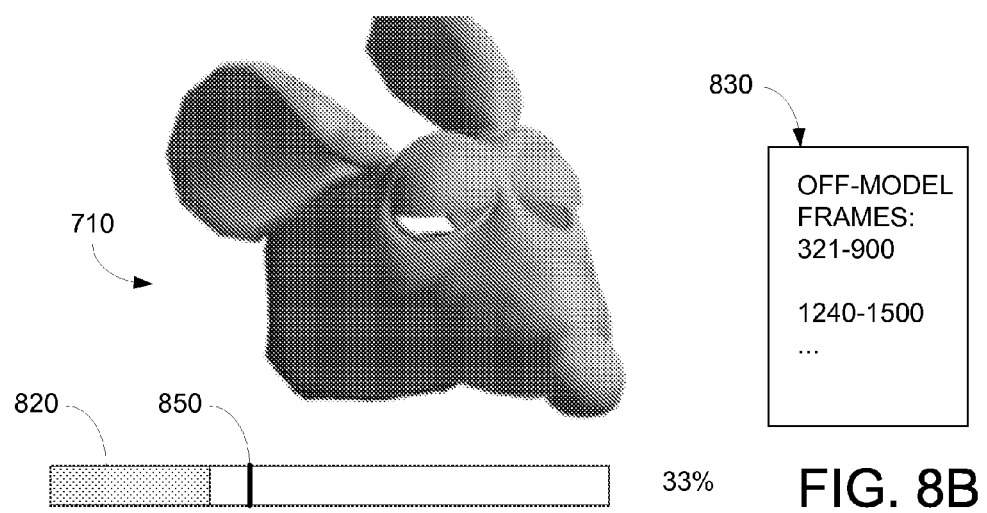
Figure 8C:
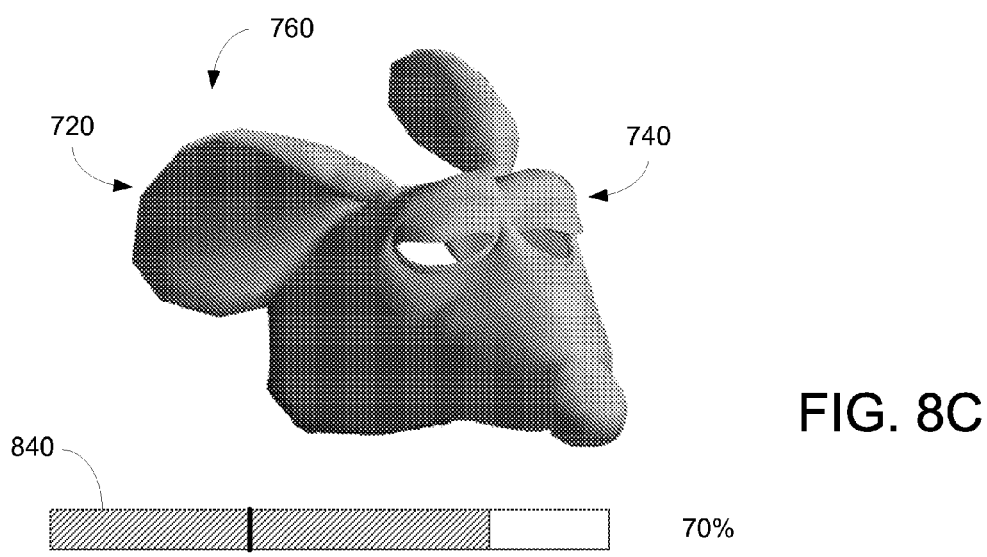

FIGS. 8A-c illustrate additional embodiments of the present invention. In specific embodiments the mathematical visual style model may be used to evaluate whether a given animation is "on model," or "off model" with respect to the style model. Initially, for example, training animation may be derived from a variety of sources as described above, such as animation of a character from a feature, short, specially created animation poses, or the like. Next, using the techniques detailed above, a mathematical visual style model may be computed.

In various embodiments, an animation sequence in question may be provided. For example, the animation sequence may be animation performed by a third-party animation studio/house. Such animation may be used for direct to digital (e.g. direct to DVD) animation, commercial advertisements, or the like. In such cases, the animation may not be specified by an animator familiar with the visual style or "quirks" of the character being animated. Accordingly, in various embodiments, the provided animation sequence is evaluated by the mathematical visual style model.

In various embodiments, the mathematical visual style model can evaluate the poses for the character and provide a quality score for the poses. For instance, in FIG. 8A, referring to pose 730 in FIG. 7A, since pose 730 was posed by-hand and in the appropriate visual style, the score 830 is high. In one embodiment, a sliding bar 800 may also be provided illustrating the quality as a bar position and/or a bar color (e.g. green). In FIG. 8B, the pose 710 in FIG. 7B is evaluated. As described above, since pose 710 only includes specification of a limited number of animation variables (e.g. 7), pose 710 is "off model." Graphically, this can be seen by the position of the sliding bar 820 and/or color (e.g. red) of sliding bar 820. As can be seen in this example, if the quality falls below a threshold 850, the frame number, or any other identifier associated with the specific pose may be recorded in a log 830 or the like.

FIG. 8C illustrates pose 720 of FIG. 7C determined based upon the visual style model. As can be seen, when evaluated against the mathematical visual style model, the sliding bar 840 is above threshold 850 and may have a specific color (e.g. yellowish green).

In some embodiments, a user need not necessarily view the animation sequence in question such as FIG. 8B-C. Instead, a user may process the animation sequence with the visual style model, and simply refer to log 830 to view the "exceptions," i.e. poses that are mathematically determined to be off-model. In various embodiments, based upon these off-model poses, the animator may fix the offending poses until they are posed with the appropriate visually style, until the quality rises above threshold 850, indicate removal of the frames including the poses, or the like. In still other embodiments, the mathematical visual style model may provide an alternative pose for those off-model poses. In alternative embodiments, the sliding bar may indicate how poor the pose is in relation to the style model. Thus, a pose displaying a shorter bar indicates a more on-model pose than a pose displaying a longer bar.

In still other embodiments of the present invention, starting with the animation sequence in question, the mathematical visual style model may be used to locate the closest poses from the training poses of the character. In such embodiments, the animation of the character from the closest poses may replace the poses specified in the animation sequence in question. For example, referring to pose 710 or 720, these poses are matched against the performance style model, and a training pose, such as pose 730 is located. In such cases, whenever the character is posed according to pose 710 or pose 720, the animation is modified and the character is posed according to pose 730. Such examples may be useful in cases where the original poses are important.

In other embodiments of the present invention, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims

What is claimed is:

1. A method for guiding animation of an animated character, the method comprising:
receiving, at one or more computer systems, information associating a performance style model with a model of the animated character in a first animation sequence, the performance style model generated in response to at least some values specified by a human artist for a plurality of animation variables of a model of the animated character in a second animation sequence having a series of one or more poses of the animated character, the performance style model including a mathematical model of a set of one or more characteristic poses in the series of one or more poses of the animated character of the second animation sequence;
receiving, at the one or more computer systems, information specifying a series of one or more poses of the animated character for the first animation sequence;
determining, with one or more processors associated with the one or more computer systems, a quality factor for each pose in the series of one or more poses of the animated character for the first animation sequence indicative of an overall quality of the pose relative to at least one pose in the set of characteristic poses in response to the performance style model and values for a plurality of animation variables of the model of the animated character in the first animation sequence; and
generating, with the one or more processors associated with the one or more computer systems, information indicative of how a performance of the model of the animated character in the first animation sequence compares to a performance of the model of the animated character in the second animation sequence in response to the quality factor determined for at least one pose in the series of one or more poses of the animated character for the first animation sequence.

2. The method of claim 1 further comprising:

receiving, at the one or more computer systems, training values for the plurality of animation variables of the model of the animated character in the second animation sequence; and generating, with the one or more processors associated with the one or more computer systems, the performance style model in response to the training values.

3. The method of claim 1 wherein generating, with the one or more processors associated with the one or more computer systems, the information indicative of how a performance of the model of the animated character in the first animation sequence compares to a performance of the model of the animated character in the second animation sequence comprises coloring of a portion of a graphical display in response to the quality factor determined for the at least one pose in the series of one or more poses of the animated character for the first animation sequence.

4. The method of claim 1 wherein generating, with the one or more processors associated with the one or more computer systems, the information indicative of how a performance of the model of the animated character in the first animation sequence compares to a performance of the model of the animated character in the second animation sequence comprises generating a log including an identifier associated with the at least one pose in the series of one or more poses of the animated character for the first animation sequence.

5. The method of claim 1 wherein generating, with the one or more processors associated with the one or more computer systems, the information indicative of how a performance of the model of the animated character in the first animation sequence compares to a performance of the model of the animated character in the second animation sequence comprises providing feedback when the quality factor determined for the at least one pose fails to satisfy a threshold quality factor.

6. The method of claim 1 further comprising generating information indicative of an alternative pose for the at least one pose in response to the performance style model.

7. The method of claim 1 further comprising:

rendering at least one image of the first animation sequence in response to the series of one or more poses of the animated character for the first animation sequence.

8. A method for generating a visual style model for an animated character, the method comprising:

receiving, at one or more computer systems, information indicative of a first plurality of poses of a first model of the animated character, wherein each pose of the first model in the first plurality of poses is specified by one or more training values for a plurality of animation parameters associated with the first model of the animated character, at least some of the training values authored by a human artist;

determining, with one or more processors associated with the one or more computer systems, a visual style model associated with the animated character in response to the first plurality of poses associated with the first model of the animated character represented as $X_i(t)$ where X is the value of an appropriately scaled ith (of m) animation parameter in the plurality of animation parameters associated with the first model of the animated character, wherein the visual style model is configured to minimize an error $$\text{Min} \sum_{i=1}^{M} \int_t Err^2(t)\, dt$$

where $$X_i(t) = \sum_{j=1}^{N} P_{ij} q_{ij}(t) + Err_i(t)$$

and wherein the P's represent performance style models or condensed performance style information and the q' represent a scaling parameter;

determining, with one or more processors associated with the one or more computer systems, a quality factor $$Q = \frac{\sum_{j=1}^{N} l_j^2}{\sum_{i=1}^{M} g_i^2}$$

for an input pose $$g_i = \sum_{j=1}^{N} P_{ij} l_j$$

of the animated character for a second animation sequence where l's are excitation values and for a "on model" pose $|l_i|$ satisfies a threshold associated with the value of the corresponding ith (of m) animation parameter and for an "off model" poses $|l_i|$ fails to satisfy the threshold associated with the value of the corresponding ith (of m) animation parameter; and generating, with the one or more processors associated with the one or more computer systems, information indicative of whether the input pose of the animated character is "on model" or "off model" in response to the determined quality factor Q.

9. The method of claim 8 wherein the visual style model is also configured to determine a plurality of output values in response to a plurality of input values of the input pose for the plurality of animation parameters.

10. The method of claim 9 wherein the plurality of output values are configured to be used to render an image of the animated character.

11. The method of claim 9 wherein the plurality of output values are configured to be used to drive a physical representation of the animated character, wherein the physical representation is selected from a group consisting of: a robot, an animatronics unit, a toy.

12. The method of claim 9 wherein the visual style model is configured to determine the pose quality in response to the input pose and in response to the plurality of output values; and wherein the visual style model is also configured to determine the plurality of output values in response to the input pose and in response to the pose quality.

13. The method of claim 9 wherein the visual style model is configured to determine the plurality of output values in response to the input pose and in response to a spectral matching process.

14. The method of claim 8 wherein the plurality of animation parameters is selected from a group consisting of: animation variables, surface deformations, posing variables, surface locations, point cloud data.

15. A non-transitory computer-readable medium storing computer-executable code for guiding animation of an animated character, the non-transitory computer-readable medium comprising:
    code for receiving information associating a performance style model with a model of the animated character in a first animation sequence, the performance style model generated in response to at least some values specified by a human artist for a plurality of animation variables of a model of the animated character in a second animation sequence having a series of one or more poses of the animated character, the performance style model including a mathematical model of a set of one or more characteristic poses in the series of one or more poses of the animated character of the second animation sequence;
    code for receiving information specifying a series of one or more poses of the animated character for the first animation sequence;
    code for determining a quality factor for each pose in the series of one or more poses of the animated character for the first animation sequence indicative of an overall quality of the pose relative to at least one pose in the set of characteristic poses in response to the performance style model and values for a plurality of animation variables of the model of the animated character in the first animation sequence; and
    code for generating information indicative of how a performance of the model of the animated character in the first animation sequence compares to a performance of the model of the animated character in the second animation sequence in response to the quality factor determined for at least one pose in the series of one or more poses of the animated character for the first animation sequence.

16. The non-transitory computer-readable medium of claim 15 further comprising:
    code for receiving training values for the plurality of animation variables of the model of the animated character in the second animation sequence; and
    code for generating the performance style model associated with the animated character in response to the training values.

17. The non-transitory computer-readable medium of claim 15 wherein the code for generating the information indicative of how a performance of the model of the animated character in the first animation sequence compares to a performance of the model of the animated character in the second animation sequence code for coloring of a portion of a graphical display in response to the quality factor determined for the at least one pose in the series of one or more poses of the animated character for the first animation sequence.

18. The non-transitory computer-readable medium of claim 15 wherein the code for generating the information indicative of how a performance of the model of the animated character in the first animation sequence compares to a performance of the model of the animated character in the second animation sequence comprises code for generating a log including an identifier associated with the at least one pose in the series of one or more poses of the animated character for the first animation sequence.

19. The non-transitory computer-readable medium of claim 15 wherein the code for generating the information indicative of how a performance of the model of the animated character in the first animation sequence compares to a performance of the model of the animated character in the second animation sequence comprises code for providing feedback when the quality factor determined for the at least one pose fails to satisfy a threshold quality factor.

20. The non-transitory computer-readable medium of claim 15 further comprising determining generating information indicative of an alternative pose for the at least one pose in response to the performance style model.

21. The non-transitory computer-readable medium of claim 15 further comprising:
    code for rendering the animated character in an at least one image of the first animation sequence in response to the series of one or more poses of the animated character for the first animation sequence.

\* \* \* \* \*

UNITED STATES PATENT AND TRADEMARK OFFICE
CERTIFICATE OF CORRECTION

PATENT NO.         : 8,648,863 B1                              Page 1 of 1
APPLICATION NO.    : 12/124006
DATED              : February 11, 2014
INVENTOR(S)        : John Anderson, Andrew P. Witkin and Robert Cook It is certified that error appears in the above-identified patent and that said Letters Patent is hereby corrected as shown below:

In the Claims:

At column 18, line 10,
Please delete "$X_i(t) = \sum_{j=1}^{N} P_j q_{ij}(t) + Err_i(t)$" and insert --$X_i(t) = \sum_{j=1}^{N} P_{ij} q_j(t) + Err_i(t)$--

At column 18, line 14,
Please delete "q" and insert --q's--

At column 18, lines 52-54,
Please delete "wherein the plurality of output values are configured to be used to drive a physical representation of the animated character,"

At column 18, line 51,
Please insert --wherein the plurality of output values are configured to be used to drive a physical representation of the animated character, and--, after "The method of claim 9"

At column 18, lines 58-60,
Please delete "wherein the visual style model is configured to determine the pose quality in response to the input pose and in response to the plurality of output values; and"

At column 18, line 57,
Please insert --wherein the visual style model is configured to determine the pose quality in response to the input pose and in response to the plurality of output values; and--, after "The method of claim 9"

Signed and Sealed this
Tenth Day of June, 2014

Michelle K. Lee
*Deputy Director of the United States Patent and Trademark Office*